Patented Dec. 30, 1930

1,786,417

UNITED STATES PATENT OFFICE

WALTER ALEXANDER, OF WHITE PLAINS, NEW YORK

ADHESIVE COMPOUND AND PROCESS OF MAKING SAME

No Drawing.   Application filed July 25, 1928.  Serial No. 295,354.

In adhesives and sizings of the prior art, those which contain a boron compound, together with starches, flours, dextrines, used separately or combined, or, one or more of the modified forms of such, have not been useful for purposes where greater flexibility is required; and where the property of adhering to certain metal, paper and other surfaces is desirable.

It is known that boron derivatives, as for example, sodium borates, potassium borates, ammonium borates, and others, cause a thickening and increased adhesiveness to ensue, when used in adhesive compositions containing starches, flours, dextrines, or one or more of the modified forms of such; in the presence of water.

I have discovered that when diethylene glycol is added to, and compounded with, adhesives containing a boron compound, of the water-soluble alkaline class described herein, that there is formed a new adhesive compound, characterized by the maintenance of the desirable body, tack, adhesiveness, and flexibility, together with the properties of producing a more satisfactory bond in the work where such finished adhesives and sizings are used.

Because of its non brittle character, my new adhesive may be used to greater advantage for pasting, gluing, and sizing purposes.

My new adhesive compounds will do efficient and economical pasting, gluing and sizing work, even under varying climatic conditions.

My improved compositions are made by adding diethylene glycol to the boron adhesive compounds, of the class described herein.

My process, according to the preferred and best method, now known to me for practising it, consists of adding the diethylene glycol to the boron compound adhesives, while such mixtures are in the fluid or nonfluid state, and then thoroughly mixing the same together, with or without the aid of heat.

The mixing is done in a suitable vessel which contains the necessary agitating machinery, to effect a thorough and intimate blending of the mixture.

My new adhesive so made, may be marketed and sold, in the fluid state; or the same may be reduced to the dry or partly dry state, by the use of drying machinery, and then the adhesive may be marketed and sold in that form.

My dry, or partly dry adhesive compounds may also be formed by mixing and compounding the diethylene glycol directly with the dry component boron adhesive constituents, or substances of this class. Such method of forming the new adhesive is easily accomplished, by the use of the regular mixing and blending machinery, which is customarily employed for the mixing and blending of materials of this character.

I have also modified starches, flours and dextrines, in aqueous solution or suspension, using for such modification converting agents, such as acids, malt diastase, and other agents, adapted to cause a starch or flour product, to become modified. To such adhesive compounds, I added the necessary amount of a boron compound, the presence of such boron compound causing a thickening and increased adhesiveness to result therein; to such mixtures, I have then added diethylene glycol.

I prefer to use some regular adhesive preservative, such as formaldehyde or beta naphthol; such preservative serving to prevent the adhesives from souring or becoming moldy on long standing.

As a more specific example of the several formulæ in which these ingredients may be combined, I give the following for producing fluid adhesives:

*Example #1.*—I take 322 pounds of water and dissolve in same 140 pounds of commercial white corn dextrine, by heating. I next add 25 pounds of borax, and after this is dissolved, I then add 7 to 12 pounds of a sodium hydrate solution 30% strength. I next add 84 pounds of diethylene glycol followed by 1½ pounds of formaldehyde. These are then thoroughly mixed until blended.

*Example #2.*—I take 1100 pounds of water, and mix into same 50 pounds of tapioca starch or flour, I then add 5 pounds of borax and heat the mixture to 200 degrees Fahrenheit, the same is kept at about this temperature for 15 or twenty minutes, I then add while mixing, 20 pounds of diethylene glycol, the mixture is then cooled to about 150 degrees Fahrenheit, and 2 pounds of formaldehyde added.

*Example #3.*—I take 40 pounds of water and dissolve therein 50 pounds of tapioca dextrine, 3 pounds of potassium borate, 3 pounds of commercial sodium meta borate, 18 pounds of diethylene glycol, the mixture is agitated, but no heating is required to effect the formation of the adhesive mixture.

For a dry or partly dry adhesive, I give the following: 210 pounds of commercial corn dextrine, 40 pounds of granulated commercial sodium meta borate, 40 pounds of diethylene glycol, ½ ounce of beta naphthol. These are mixed together thoroughly in a mixing machine. This dry adhesive mixture may be used in cold or hot water.

Having thus described my invention, and the best manner of practicing the new process of forming this novel composition, but without limiting myself to the order of steps, of such process recited, or the proportions of parts employed therein, or to the precise ingredients named, as it is evident that each of these ingredients has a considerable range of equivalents and that the order and proportions of the process may be varied without departing from its scope and purposes,

I claim:

1. An adhesive consisting of a starch, a water-soluble, alkaline boron compound and diethylene glycol.

2. An adhesive consisting of a modified starch, a water-soluble, alkaline boron compound and diethylene glycol.

3. The process of making an adhesive composition characterized by high flexibility when dried consisting in dissolving an adhesive base of starch origin in water; adding a water-soluble, alkaline boron compound thereto and dissolving same therein; and agitating the mixture while adding diethylene glycol thereto until uniformly blended.

4. The process of making an adhesive composition characterized by high flexibility when dried consisting in dissolving an adhesive base of starch origin in water; adding a water-soluble, alkaline boron compound thereto and dissolving same therein; heating the mixture and agitating same while adding diethylene glycol thereto until uniformly blended.

5. The process of making an adhesive composition characterized by high flexibility after hardening consisting in mechanically mixing in a dry state an adhesive base of starch origin and a water-soluble, alkaline boron compound, and intimately blending diethylene glycol with the dry mixture.

WALTER ALEXANDER.